US008903855B2

(12) United States Patent
Saru et al.

(10) Patent No.: US 8,903,855 B2
(45) Date of Patent: Dec. 2, 2014

(54) PROFILING METHOD AND SYSTEM

(71) Applicant: Apple Inc., Cupertino, CA (US)

(72) Inventors: Sami Saru, Turku (FI); Janne Aaltonen, Turku (FI); Timo Ahopelto, Helsinki (FI); Pekka Ala-Pietila, Helsinki (FI)

(73) Assignee: Apple Inc., Cupertino, CA (US)

( * ) Notice: Subject to any disclaimer, the term of this patent is extended or adjusted under 35 U.S.C. 154(b) by 95 days.

(21) Appl. No.: 13/855,366

(22) Filed: Apr. 2, 2013

(65) Prior Publication Data

US 2013/0268371 A1 Oct. 10, 2013

Related U.S. Application Data

(62) Division of application No. 13/001,529, filed as application No. PCT/EP2009/058135 on Jun. 29, 2009, now Pat. No. 8,417,722.

(60) Provisional application No. 61/076,395, filed on Jun. 27, 2008.

(51) Int. Cl.
*G06F 17/30* (2006.01)
*G06Q 30/02* (2012.01)

(52) U.S. Cl.
CPC ............ *G06Q 30/0269* (2013.01); *G06Q 30/02* (2013.01)
USPC ....................................................... 707/769

(58) Field of Classification Search
None
See application file for complete search history.

(56) References Cited

U.S. PATENT DOCUMENTS

| | | | |
|---|---|---|---|
| 2004/0095907 A1* | 5/2004 | Agee et al. ..................... | 370/334 |
| 2005/0044147 A1* | 2/2005 | Yap ............................... | 709/205 |
| 2007/0271272 A1* | 11/2007 | McGuire et al. ................ | 707/9 |
| 2009/0006083 A1* | 1/2009 | Bachand ........................ | 704/201 |
| 2009/0158211 A1* | 6/2009 | Gogolak ....................... | 715/811 |
| 2010/0153832 A1* | 6/2010 | Markus et al. ................ | 715/205 |

* cited by examiner

*Primary Examiner* — Wilson Lee
(74) *Attorney, Agent, or Firm* — Blakely, Sokoloff, Taylor & Zafman LLP

(57) ABSTRACT

The invention relates to a method and system for profiling recipients into recipient categories on the basis of responses to content items provided to users. The profiling is based on rankings that are assigned to the content items, recipient categories, links between the content items and links between the content items and recipient categories. In one embodiment the ranking of a given content item is calculated on the basis of rankings of other content items having a link to the given content item, together with the ranking of the link between the content items, while the ranking of a given respondent in respect of a given recipient category is calculated on the basis of rankings of content items and/or categories that have a link to that recipient category. The links between content items and to the recipient categories indicate a particular response, by the respondent, in respect of content items. The recipients are profiled with respect to the recipient categories on the basis of the rankings assigned to the recipient categories.

6 Claims, 9 Drawing Sheets

PROFILING METHOD AND SYSTEM

CROSS-REFERENCE TO RELATED APPLICATIONS

This application is a divisional of co-pending U.S. application Ser. No. 13/001,529 filed on Aug. 18, 2011, which claims the benefit of priority to International Patent Application No. PCT/EP2009/058135 filed 29 Jun. 2009, which further claims the benefit of priorities to Great Britain Patent Application No. 0811799.6 filed 27 Jun. 2008, U.S. Provisional Application No. 61/076,395 filed 27 Jun. 2008 and European Patent Application No. 08167423.6 filed 23 Oct. 2008, the contents of which are incorporated herein by reference in their entirety.

FIELD OF THE INVENTION

The invention relates generally to profiling of recipients, and more particularly, to a method for profiling recipients on the basis of responses given by the recipients to content items delivered to the recipients.

BACKGROUND

Conventional methods for delivering advertisement data typically involve broadcasting messages to mass markets. This is usually described as a "Spray and Pray" approach, wherein the advertisement data is delivered to a wide audience and it is hoped that the advertisement data will be received by a sufficient number of potential recipients that are appropriate targets of the advertisement. Although an advertiser may take steps to ensure that the advertisement data is delivered via channels that traditionally are expected to reach a significant concentration of potential recipients, there is nevertheless little or no means to guarantee that the advertisement data is delivered to most appropriate recipients. An example of conventional mass marketing strategy is delivery of advertisement data through television channels and inclusion of the advertising data into commonly visited Internet websites.

Direct mailing campaigns via traditional mail and via electronic mail are considered to be more accurate in delivering advertisement information to targeted individuals and/or groups. In addition to the conventional electronic mail it is possible to use other electronic message delivery means for delivery of advertisement data, for example SMS-messages (Short Message Service) or MMS-messages (Multi Media Service) that can be delivered via a mobile communication network. Sending advertisement messages to recipients via a mobile communication network in a large scale causes often a lot of situations in which a certain advertisement message is received by an individual that is far from an optimal target for that advertisement message. For example, a message advertising large cars such as suburban vehicles (SUV) may be received by an environmentally conscious person that has adopted an attitude of hostility to such cars. In order to avoid situations of the kind described above or at least to minimise the amount of such situations there is a need to profile the recipients in such a manner that advertisement messages can be targeted to suitable recipients.

The profiling of the recipients can be based on answers given by the recipients to questions that have been delivered to the recipients e.g. via a communication network. Furthermore, the profiling can be based on demographic data related to the recipients. The answers to the questions and possibly also the demographic data constitutes raw data with the aid of which the recipients are categorised. In a situation in which there is only one question or only a few questions, the profiling may be too coarse or, in some cases, even misleading. For example, a question may be "Do you think the environment is important: Yes/No?". Most of the people would answer "Yes" to this question albeit their actions and/or attitudes do not support that because the answer "No" would indicate exceptional egomania. From the advertisement point of view this "Yes" answer would lead to addressing ecologically friendly products to such recipients who would actually, for example, drive a SUV with a large consumption of gas and/or practise other behaviour that is far from environmental. In a situation in which there are a large number of questions, the number of different answer combinations gets high. For example, if there are N questions each of which having M answer-alternatives, the number of different answer combinations is $M^N$. From the viewpoint of practical needs, the number of different recipient categories into which the recipients will be profiled has to be substantially smaller than the number of different answer combinations ($M^N$). Therefore, the different answer combinations have to be mapped to a lower number of recipient categories in a manner that provides a sufficiently veracious profiling of the recipients.

SUMMARY

The following presents a simplified summary in order to provide a basic understanding of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to the more detailed description below.

In accordance with at least one embodiment of the invention, a method, a system, a database, and a computer program are provided for profiling recipients into pre-determined recipient categories. The profiling is based at least partly on link rankings that are defined according pre-determined rules for content items delivered to the recipients and for the recipient categories. The content items can be embodied as messages containing data prompting the recipient for a response. An example of a content item can be an advertisement, which can be considered to implicitly contain a question in the sense that it prompts the recipient to respond with what can be considered an answer that is intrinsically linked to the content of the question.

The supporting and/or the implementation of the functionality for profiling the recipients are/is achieved by a combination of features recited in each independent claim. Accordingly, dependent claims prescribe further detailed implementations of the present invention.

Various exemplifying embodiments of the invention together with additional objects and advantages will be best understood from the following description of exemplifying embodiments when read in connection with the accompanying drawings.

The exemplifying embodiments of the invention presented in this document are not to be interpreted to pose limitations to the applicability of the appended claims. The verb "to comprise" is used in this document as an open limitation that does not exclude the existence of also unrecited features. The features recited in depending claims are mutually freely combinable unless otherwise explicitly stated.

BRIEF DESCRIPTION OF THE FIGURES

The exemplifying embodiments of the invention and their advantages are explained in greater detail below with reference to the accompanying drawings, in which:

FIG. 2b is a schematic diagram showing an example of a profiling network comprising links between the questions and categories of FIG. 2a;

FIG. 2c is a schematic diagram showing an alternative profiling network comprising links between the questions and categories of FIG. 2a;

DESCRIPTION OF THE EXEMPLIFYING EMBODIMENTS

Figure 1:
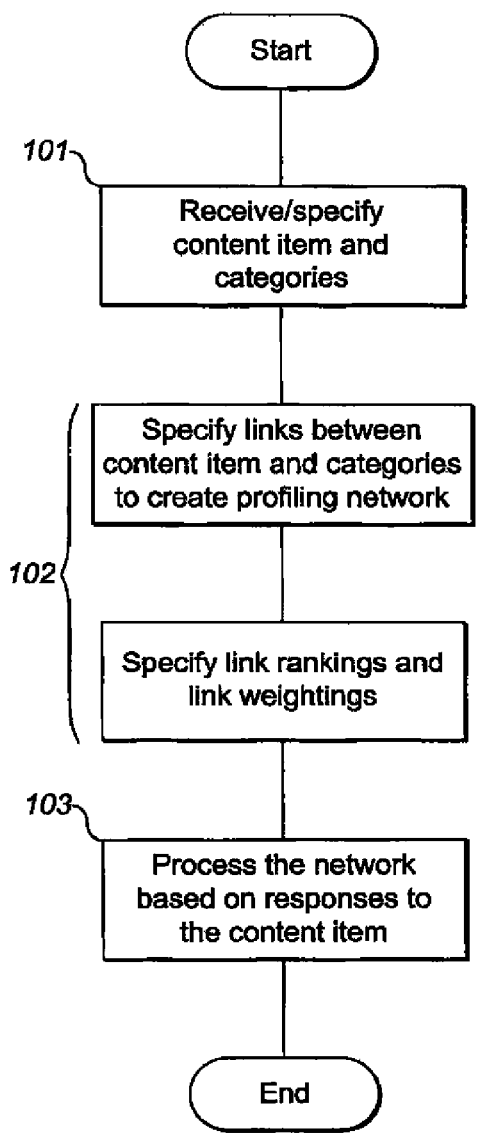
FIG. 1 shows a high-level flow chart of a method according to an embodiment of the invention for profiling recipients.

FIG. 1 shows a high-level flow chart of a method according to an embodiment of the invention for profiling one or more recipients into one or more recipient categories. The recipient categories can be for example: "environmental mindset" and "gender". The content items can be embodied as messages containing data prompting the recipient for a response. An example of a content item can be an advertisement, which can be considered a form of question: e.g. an image showing a florist shop and a suggestion that the recipient might be seeking a job in association with the florist shop; or e.g. an image showing a SUV, suggesting that the recipient might like further information relating to the SUV. In FIG. 1 these are shown in the form of questions that we paraphrase here as: "Would you like to drive a suburban vehicle? Yes/No", "Wanna be a florist?", "Bottled water or tap water?", or "What is your age in years?" etc. The task is to profile the recipient or recipients into one or more of the recipient categories on the basis of the responses given by the recipient or recipients to the content items sent to the recipient or recipients. In the following embodiments, content items are conveniently referred to as questions, but it is to be understood that these are a non-limiting example of such.

Figure 2A:
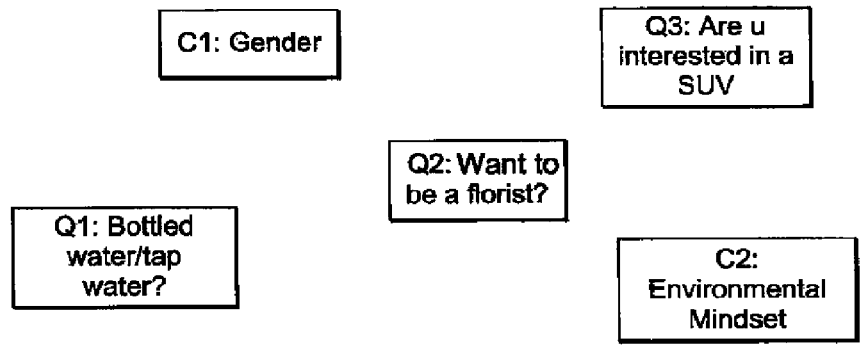
FIG. 2a is a schematic diagram showing an example of questions and categories used to profile respondents.
Figure 2B:
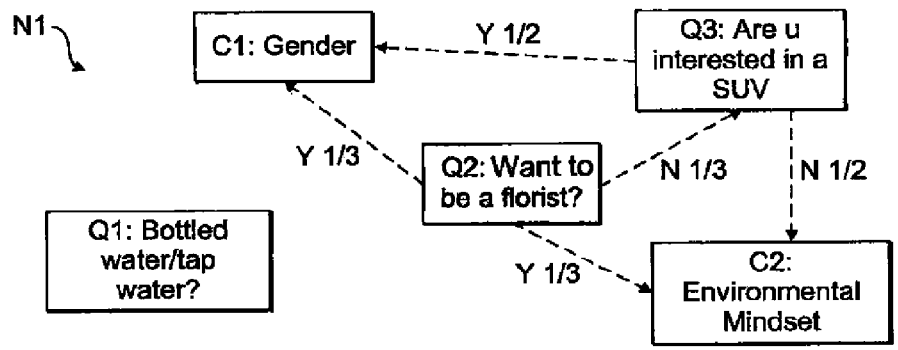

As can be seen from FIG. 1, the method can be broadly characterised as comprising a plurality of phases 101, 102, 103, each of which can be processed independently of the other and can be triggered part-way through the operation of other phases. Phase 101 comprises receiving and/or defining questions to be used in identifying recipient categories, and indeed receiving and/or defining these categories. Questions and categories can be defined at any time and/or retrieved from a repository holding same. Phase 102 comprises specifying links between the questions and categories so as to create a network of nodes represented by questions and categories, together with specifying values. A link value may include a link ranking and/or a link weighting corresponding to the link. A link ranking is a parameter indicative of the relationship between connected nodes (i.e. questions and/or questions→categories and/or categories→categories) in the network, while a link weighting is a parameter indicative of the relative importance of a given link emanating from a given node compared to different links emanating from the same given node. An example of the output of phase 101 is shown in FIG. 2a, where nodes corresponding to categories are depicted differently to nodes corresponding to questions. The output of phase 102, a profiling network N1, is shown in FIG. 2b for the case where only some links have been specified between nodes, and the links that exist have been assigned link rankings but not link weightings.

Figure 2C:
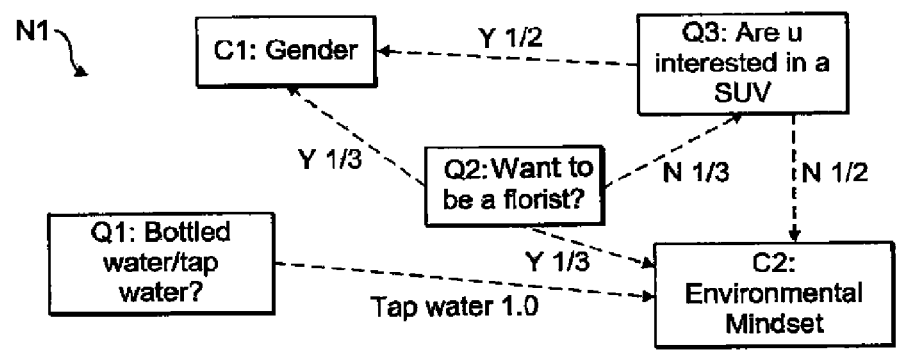

As mentioned briefly above, it is to be noted that questions can be retrieved according to Phase 101 at any time, and indeed the design of the network can be amended according to Phase 102 at any time, either to account for newly added questions and/or to change the link rankings applied to existing questions. Indeed, FIG. 2c shows a different network of links between the nodes, where Q2 is linked to category C1 but an answer of No and a link ranking of ⅓, while Q1 is linked to category C2 with a link ranking of value 1.0.

Figure 3A:
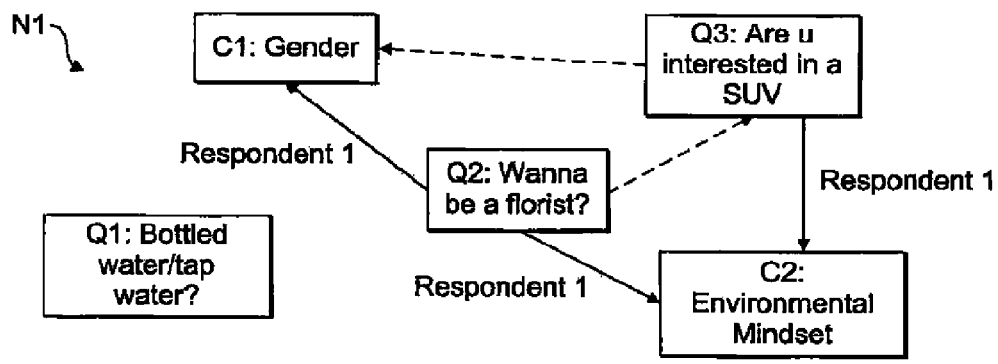
FIG. 3a is a schematic diagram showing a first example of paths traced through the profiling network of FIG. 2b.
Figure 3B:
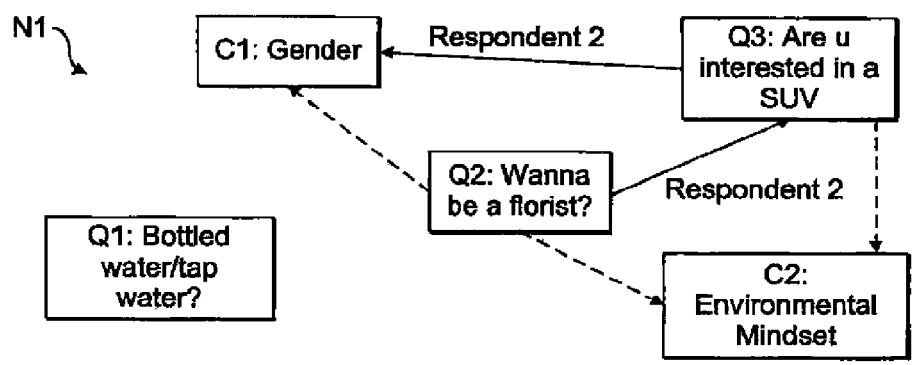
FIG. 3b is a schematic diagram showing a second example of paths traced through the profiling network of FIG. 2b.

Phase 103 involves collecting answers to the questions and tracing a path through the network on the basis of the collected answers so as to assign category values to the respondents. As an alternative to tracing a path on the basis of actual answers, paths can be identified on the basis of a set of hypothetical answers which may, for example, be specified in a log file or similar. Tracing paths through the network N1 can be visualised as activating links through the network. An exemplary set of paths is shown in FIG. 3a for answers received from a first respondent in relation to the network shown in FIG. 2b: from this example it can be seen that the previously dashed lines have become solid lines, thereby indicating paths through the profiling network N1 for this respondent, which terminate at the categories C1, C2. The values of the link rankings for the paths are combined so as to enable calculation of values for each of the categories, and thereby provide a measure of correlation for the respondent to a particular category. For example, in the case of respondent 1, his correlation with the gender corresponding to C1 is ⅓, while his correlation with the environmental mindset corresponding to C2 is ⅓+½=0.833. A second exemplary set of paths is shown in FIG. 3b for answers received from a second respondent, who provided quite different answers to those provided by the first respondent. Accordingly, his correlation with the gender corresponding to C1 is ⅓+½=0.833, while his correlation with the environmental mindset category C2 is 0.

Whilst the examples shown in FIGS. 2a-3b are representative of a profiling network comprising only a few nodes, it will be appreciated that a typical profile updating exercise is likely to involve a network comprising hundreds of nodes and a commensurate number of links therebetween. In addition, respondents are likely to provide their responses via a range of communications mediums and from a range of devices. Accordingly, and in order to process the data received from such respondents in a scalable manner, the steps involved in Phases 102 and 103 are performed by various components of a distributed computer system such as that shown in FIG. 4.

Figure 4:
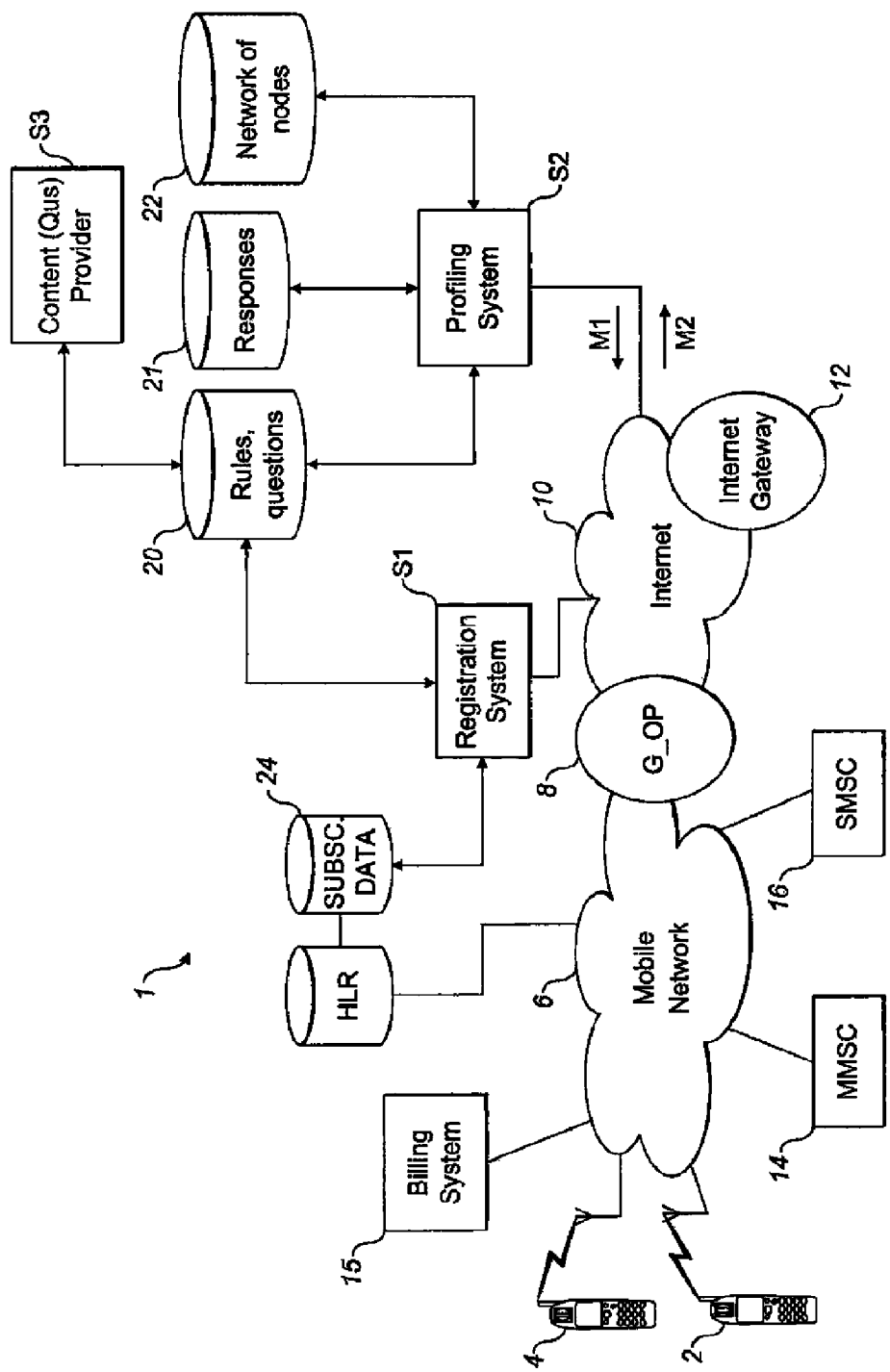
FIG. 4 is a schematic diagram showing a distributed system within which embodiments of the invention operate.

FIG. 4 shows a typical communications network 6, 10 that comprises or is connected to a distributed system according to an embodiment of the invention for profiling actual or potential respondents, e.g. 2, 4. In the arrangement shown in FIG. 4, a terminal 2 communicates with various network devices via the mobile network 6, which comprises: a conventional radio and switching network comprising base stations; switches (not shown) arranged in a conventional manner; and a home location register (HLR) for maintaining data relating to subscribers of the network. The mobile network 6 also comprises a billing system 15 for holding Call Detail Records (CDRs) relating to network services used by subscribers of the network 6 and store-and-forward message servers MMSC, SMSC 14, 16 configured to store and forward messages in accordance with conventional methods. The terminal 2 may be a wireless terminal such as a mobile phone, a laptop computer or a PDA. The data messaging system 1 also comprises a WAP gateway 8, which is typically a network operator's WAP gateway, and a registration services server S1, with which a terminal, typically connected to the Internet 10, communicates via internet gateway 12 to enable a given potential respondent to subscribe to the profiling service according to embodiments of the invention.

In embodiments of the invention it is assumed that the questions utilized to form a profiling network N1 are available from sources such as exemplary server S3, and thence stored in data storage 20 for retrieval by a profiling system S2 for formulating a profiling network N1 of questions and for delivery as messages M1 via the communications network 6, 10; similarly, the responses M2 to the questions can be received and stored in database 21, while the links defining a given profiling network, together with associated link rankings and link weightings can be stored in database 22. It is to be appreciated that while these databases are shown as distinct entities, they could alternatively be part of an integrated storage system. Similarly, while the profiling system S2 is shown as being embodied in a single server S2, it is to be understood that the profiling system could be distributed between different devices according to the functionality required to a) process the questions, b) form a profiling network, and c) receive and process responses according to the profiling network. Further these different devices on which embodiments of the invention are configured could include web servers and/or store and forward devices such as the SMSC 16 and MMSC 14 shown in FIG. 4.

Whilst shown as a mobile network 6 and the Internet 10, the communications network can be a mobile communication network capable of supporting, for example, one or more of the following communication protocols: GSM (Global System Mobile), WCDMA (Wideband Code Division Multiple Access), GPRS (General Packet Radio Service). In addition to or instead of the mobile communication network, a local area network such as a Wireless Local area network (WLAN) or Blue-Tooth® (BT) and/or other technologies such as WiMax, Broadcasting over DVB-H (Digital Video Broadcasting—Handhelds), ISDB-T (Integrated Services Digital Broadcasting for Terrestrial television broadcasting), DMB (Digital Media Broadcasting) or broadcasting over cellular can be used. The communication network can be also a combination of two or more technologies i.e. hybrid communication network. The communication network can also be arranged to support generic Internet access using any transport methods. The questions and the answers given to questions can be transferred in the electrical communication network, for example, as SMS-messages (Short Message Service), MMS-messages (Multi Media Service), Wireless Application Protocol (WAP) pages, Internet pages, HTML (Hypertext Mark-up Language) pages, XHTML (eXtended HTML) pages, IP-datagrams (Internet Protocol), or email letters (electronic mail).

In some embodiments of the invention it is assumed that the user of the terminal 2 is a subscriber of the profiling service according to embodiments of the invention, and that subscribers have entered data indicative of at least some of demographic data, preferences and interests, these data being received and stored by the registration server S1 in the subscriber database 24. As described above, the subscriber database 24 can be associated with a HLR for the mobile network 6: in a preferred arrangement, the preference data can be stored in a logically distinct storage area to that in which the network services and subscription data are stored, thereby decoupling the storage of preference data from the storage of the profiling network data. Alternatively the user can choose not to enter any preference data, in which case messages can be selected at random and a profile built up on real time (on the fly) based on responses to the messages.

Figure 5:
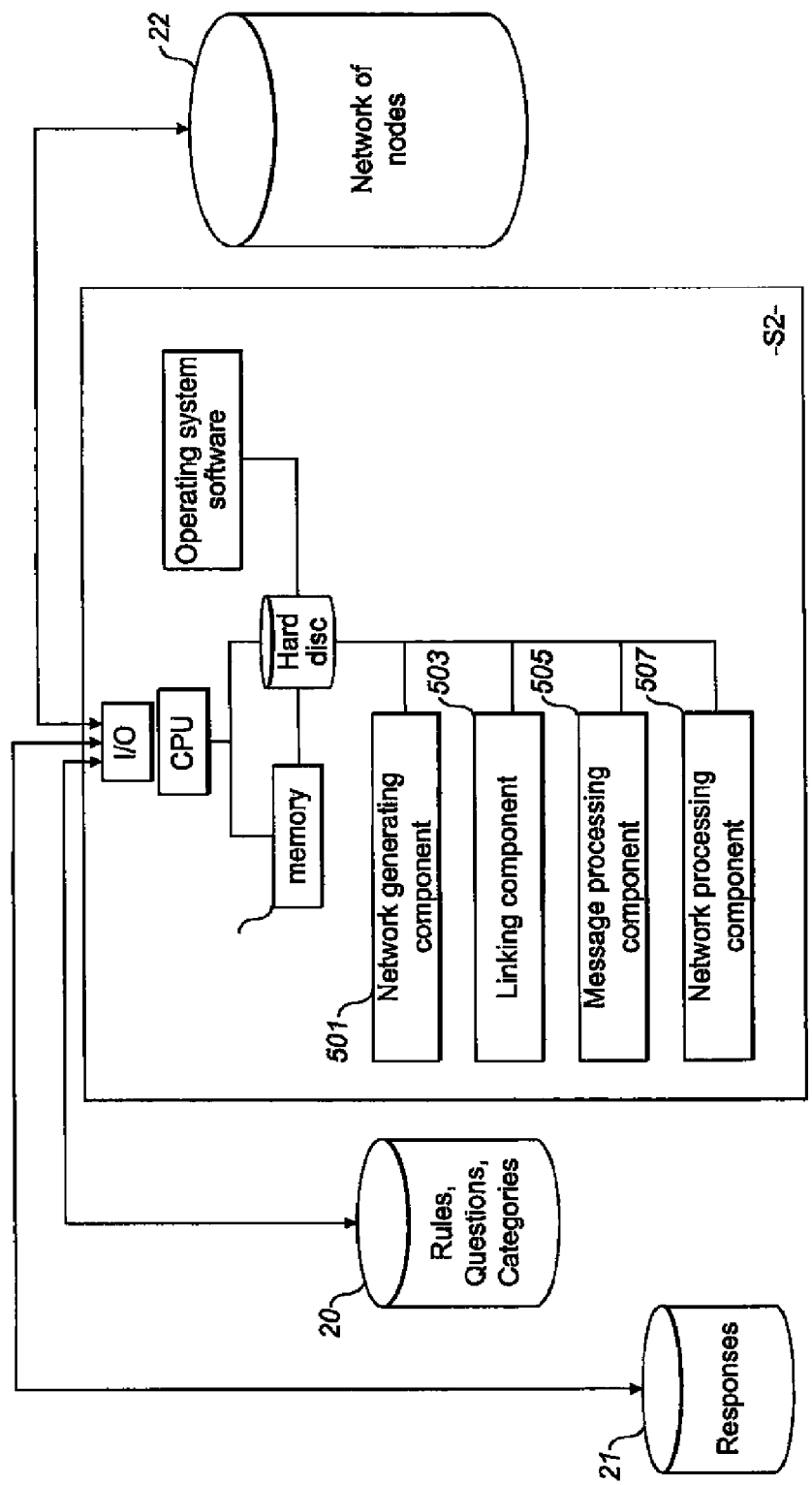
FIG. 5 is a schematic diagram showing components of the profiling system of FIG. 4.

Turning now to FIG. 5, an arrangement of the profiling system S2 will now be described in more detail: in addition to standard CPU, memory, data bus, Input/Output ports, data storage, and operating system programs, the server S2 comprises various bespoke software components 501, 503, 505, 507 which retrieve data from the various databases 20, 21, 22 in order to generate a network of linked questions and categories, to formulate messages comprising the questions, and to processes responses from recipients thereof in order to trace paths through the network N1 according to embodiments of the invention. More specifically, the network generating component 501 queries database 20 to retrieve questions and categories stored therein, and, on the basis of rules associated with the questions, creates links between the questions and categories. As described briefly above with reference to Phase 102, creation of a profiling network can be triggered at any time, and on the basis of events such as receipt of a certain number of questions from a given source S3; receipt of a certain number of responses from respondents; an amount of time having passed since the network N1 was last created; receipt of a new or amended set of inter-question linking rules and/or link rankings and/or link weightings; and/or manual triggers from whichever entity is responsible for managing generation of the profiling network N1. The profiling network N1, specifically the links, link rankings and link weightings, where appropriate, between the questions and categories making up the network N1 so created is then stored in the database 22, preferably together with a profiling network identifier and a timestamp indicating a time at which the network N1 was created.

Further, the links can be derived on the basis of data related to the answers given to the questions, as identified by the message processing component 505, described below. Data related to an answer can include for example: the content of the answer, a location where a recipient was situated when giving the answer, a point of time (a time of day, a day of week, etc) when the answer has been given, and/or a temporal delay from a moment of delivering the question to a recipient to a moment when the answer has been given. Such automated derivation of the links based on feedback from responses to questions can be performed by the linking component 503, which can additionally set several links between questions Q1, Q2, Q3, Q4 . . . on the basis of data related to an answer given to the question Q1. The information that indicates how the links are to be set can be included, for example, in metadata associated with the question Q1. The linking rules so derived can be stored in the database 20, for future use by the network generating component 501 or can trigger the network generating component 501 to perform real time generation of a profiling network N1. Yet further, links can be associated with time-to-live conditions. For example, a link may be defined to be valid only for a limited time interval after setting the link and to be removed after the limited time interval has elapsed.

Turning now to the distribution of the questions to recipients, the message processing component 505 is arranged to retrieve questions from the database 20 and formulate messages M1 associated therewith for transmission to recipients via the communications network. In an arrangement according to an embodiment of the invention, the message processing component 503 is arranged to select one or more recipients to be targets of a predetermined action as a response to a situation in which rankings of the recipient categories fulfill a pre-determined condition. The pre-determined action can be, for example, an advertisement campaign related to a specified product or service, an offer to provide a specified product or service for a reduced price, or sending a set of pre-determined questions to the selected recipients in order to collect further information about the selected recipients. In addition the message processing component 505 is arranged to process received responses M2 to the questions (i.e. answers to questions), and to store the responses, in association with an identifier associated with the respondent, in a database 21 for use by the network processing component 507 and the linking component 503 in the manner described above.

Figure 6A:
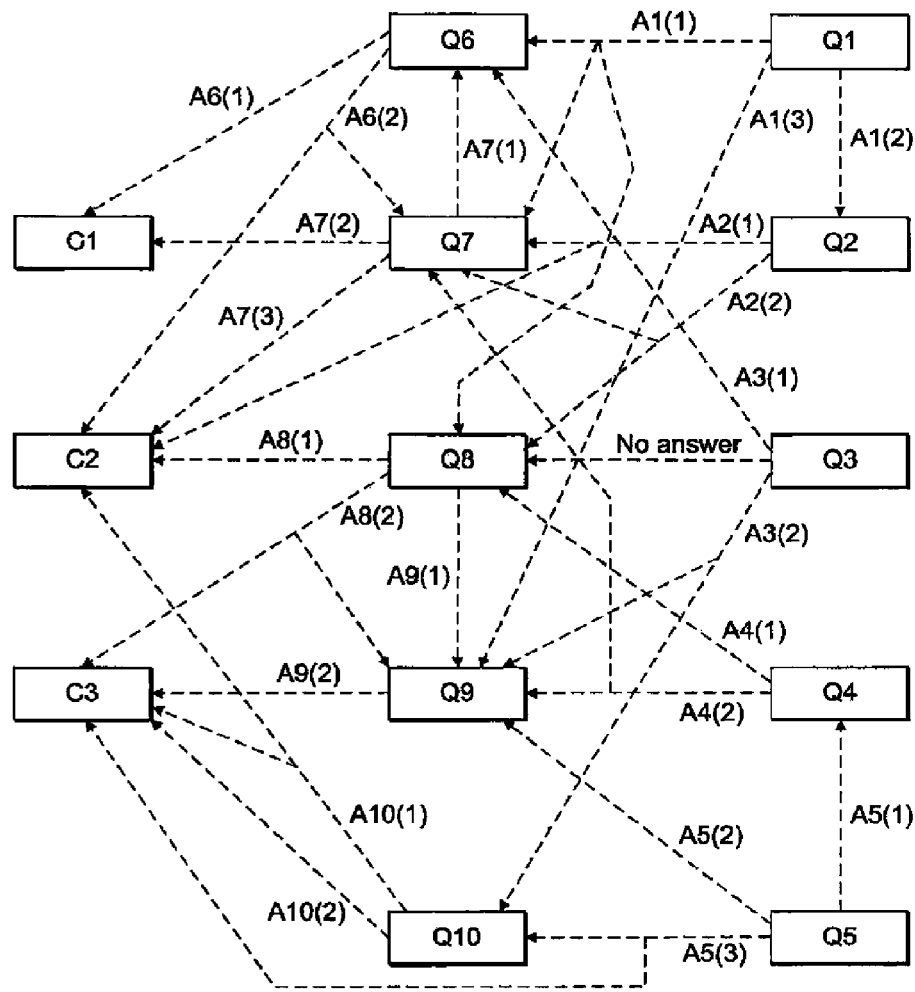
FIG. 6a shows a diagram illustrating an exemplifying pre-determined rule according to which links pointing to questions and to recipient categories can be set in a method according to an embodiment of the invention.

FIG. 6a shows an exemplifying profiling network N1, according to which links to questions Q1-Q10 and to recipient categories C1-C3 have been set by the network generating component 501 on the basis of linking rules stored in the database 20. For example, a question Q1 can be answered with three alternative answers A1(1), A1(2), and A1(3). For example Q1 can be "Do you use milk products?", A1(1) can be "Yes, very much", A1(2) can be "Yes quite a lot", and A1(3) can be "A little". It can be seen from FIG. 6a that Q1 has a link to Q6, to Q7, and to Q8 when Q1 is answered with A1(1), Q1 has a link only to Q2 when Q1 is answered with A1(2), and Q1 has a link only to Q9 when Q1 is answered with A1(3). Each of these links is associated with a link ranking in the manner described above, with a configurable value specified in the database 20. In addition each of the links can be associated with link weightings, which weights the various links relative to one another. The questions Q6, Q7, and Q8 can be, for example, questions that are used for surveying what kind of milk products are being used by a recipient or recipients that answers/answer the questions Q1-Q10. In this exemplifying case, importance is given to questions that are used for surveying what kind of milk products are being used when a question "Do you use milk products?" is answered with "Yes, very much". The other links can be set in the same way, so that for example, Q10 has a link to recipient categories C2 and C3 when Q10 is answered with A10(1).

In the foregoing, each link that set according to an answer to a question is a "positive link" that gives importance to a linked question or recipient category. It is also possible that a link is a "negative link" that decreases the importance of a linked question or recipient category, whereby a certain answer to a certain question decreases importance, i.e. ranking, of another question or a recipient category. Such link rankings can be pre-specified or specified on the basis of response messages; for example, in relation to the latter scenario, a lack of answer can be defined to represent a situation in which no link is set or the lack of answer can be defined to correspond to setting a link in a same manner as an answer. For example, a link from Q3 to Q6 can be conditional upon Q3 being answered with A3(1), links from Q3 to Q9 and to Q10 can be conditional upon Q3 being answered with A3(2), and a link from Q3 to Q8 can be conditional upon a null response in respect of Q3.

In the profiling network N1 created by the network generating component 501 and shown in FIG. 6a, a ranking is assigned to each question on the basis of link rankings associated with answers to other questions that have a link to that question. For the particular implementation shown in FIG. 6a, questions Q1, Q3, Q5 are not pointed to by any links and thus these questions Q1, Q3, Q5 cannot inherit link rankings from any other questions. In order to avoid a trivial solution in which all the link rankings of the questions Q1-Q10 and of the recipient categories C1-C3 are zero, initial rankings are assigned to at least the non-pointed questions Q1, Q3, Q5. The initial rankings can be a same value (a real number) for all the questions Q1, Q3, Q5 or question-specific initial rankings can be assigned to different questions Q1, Q3, Q5. The question-specific initial rankings can be determined, for example, on the basis of demographic data related to a recipient or recipients.

It is also possible to assign constant or question-specific initial rankings to all the answers to questions Q1-Q10 and to assign constant or recipient category—specific initial rankings to all the recipient categories C1-C3. Without limiting generality, it can be assumed that for questions having no initial link from another question, $R_0(Qi)=0$. The same applies for the recipient categories. It is also possible that a certain question or a certain recipient category has a negative initial ranking. A negative initial ranking means a purposive reduction of importance of an answer to a particular question or recipient category (and of answers to those questions and/or recipient categories that are pointed by that question or recipient category provided that a higher value of link ranking is defined to mean higher importance (by contrast if a lower value of link ranking were defined to mean higher importance, the situation would be reversed)).

Figure 6B:
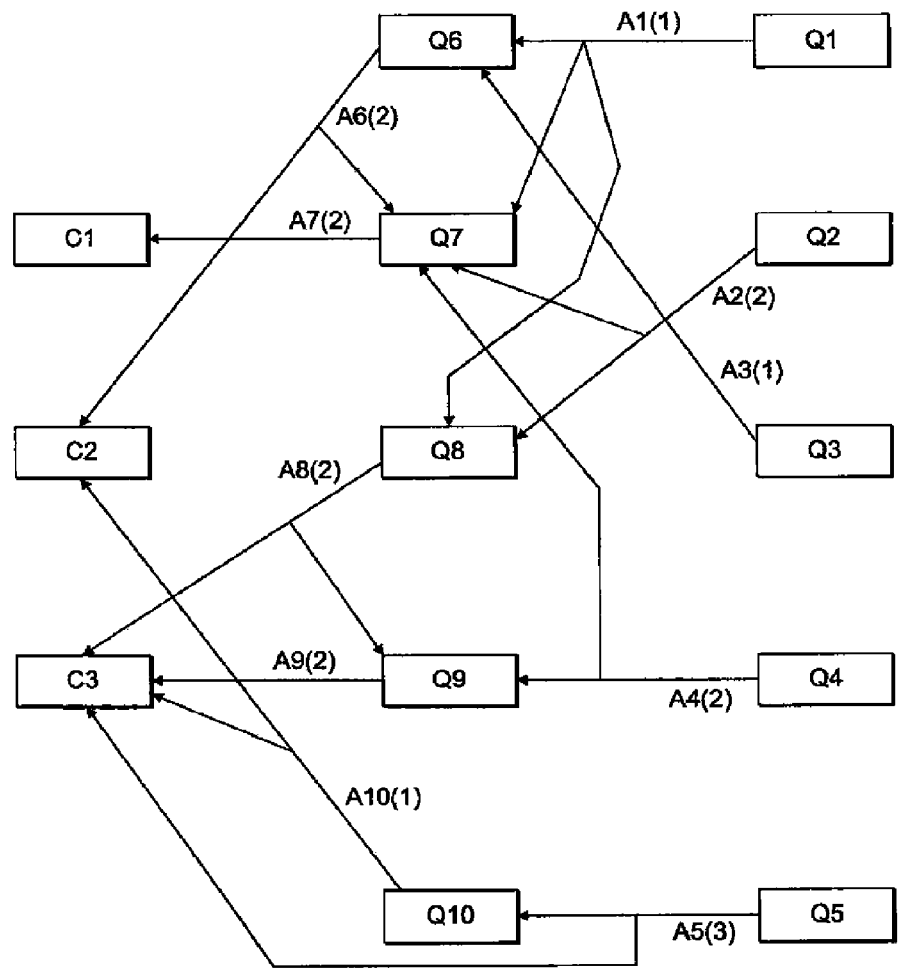
FIG. 6b shows a diagram illustrating exemplifying links that have been set according to the pre-determined rule of FIG. 2b in a method according to an embodiment of the invention.

As described above, whilst the network generating component 501 creates a network N1 of the form shown in FIG. 6a based on the linking information, the actual paths through the network N1, and thus actual rankings R(Q1)-R(Q10) associated with paths and categories linked thereto, are calculated by the network processing component 507 when responses to the questions have been received so as to generate category values based on the actual path traced through the profiling network N1. An example of the paths traced through the network N1 is shown in FIG. 6b, as indicated by the fact that certain of the dotted lines shown in FIG. 6a are now presented as solid lines.

As an alternative, the profiling network N1 can be pre-processed, that is to say that hypothetical paths can be traced through the network N1, each representing a set of answers relating to one or more respondents, thereby enabling any given respondent to be profiled on the basis of his answers in an expedient fashion. Whilst either situation is possible, for illustrative purposes it will be assumed that the responses have been received from respondents tracing the paths indicated in FIG. 6b. The rankings of the questions Q1-Q10, respectively, can be calculated, for example, as follows:

$$R(Q1)=R_0(Q1),$$

$$R(Q2)=R_0(Q2),$$

$$R(Q3)=R_0(Q3),$$

$$R(Q4)=R_0(Q4),$$

$$R(Q5)=R_0(Q5), \qquad (1)$$

$$R(Q6)=R_0(Q6)+R(Q1)+R(A1(1))/3+R(Q3)+R(A3(1)),$$

$$R(Q7)=R_0(Q7)+R(Q1)+R(A1(1))/3+R(Q2)+R(A2(2))/2+R(Q4)+R(A4(2))/2+R(Q6)+R(A6(2))/2,$$

$$R(Q8)=R_0(Q8)+R(Q1)+R(A1(1))/3+R(Q2)+R(A2(2))/2,$$

$$R(Q9)=R_0(Q9)+R(Q4)+R(A4(2))/2+R(Q8)+R(A8(2))/2, \text{ and}$$

$$R(Q10)=R_0(Q10)+R(Q5)+R(A5(3))/2.$$

Two things are to be noted in relation to this example:
1. Only one of the possible answers to any given question has been received from the respondents (taking Q1, only answer A1(1) is shown, whereas, as can be seen from FIG. 6a, there are two other possible answers, A1(2) and A1(3)).
2. The link rankings for particular answers to questions have been equally split between the number of questions to which the answers are linked (e.g. link ranking between questions Q1 and Q6 is R(A1(1))/3 because answer A1(1) to question Q1 is linked to three different questions, Q6, Q7, Q8).

However, and as demonstrated by the simplified example shown in FIG. 2b, there is no requirement for the sum of the link rankings associated with all answers to a given question to sum to one, or for the link rankings to be equally distributed between the answers to the questions. Indeed the linking information can be specified in any manner (as mentioned several times above). Furthermore it will be appreciated that typically different answers to any given question will be received from a range of respondents. Indeed, when taking account of the fact that there are three possible answers to Q1 (A1(1), A1(2), A1(3)), and assuming each of the possible answers to be equally weighted, R(Q6) can alternatively be expressed as $R(Q6)=R_0(Q6)+R(Q1)+R(A1(1))/3+R(Q3)+R(A3(1))$.

Working with the set of question rankings of equation (1), the category rankings R(C1)–R(C3) of the recipient categories C1-C2, respectively, can be calculated, for example, as follows:

$$R(C1)=R_0(C1)+R(Q7)+R(A7(2))$$

$$R(C2)=R_0(C2)+R(Q6)+R(A6(2))/2+R(Q10)+R(A10(1))/2, \text{ and} \quad (2)$$

$$R(C3)=R_0(C3)+R(Q8)+R(A8(2))/2+R(Q9)+R(A9(2))+R(Q10)+R(A10(1))/2+R_0(Q5)+R(A5(3))/2.$$

The network processing component 507 is arranged to profile respondents into the recipient categories C1-C3 on the basis of the category rankings R(C1)-R(C3) calculated from the responses, and a measure of correlation of a given respondent with each category is given by the values output in relation to equations (2). Thus the output of equations (2) indicates which one of the recipient categories C1-C3 matches best with the recipient or recipients.

If for example R(C1)>R(C2)>R(C3), the recipient category C1 matches best with the recipient or recipients and the recipient category C2 matches secondly best with the recipient or recipients (if a higher value of ranking is defined to mean higher importance). If for example R(C1)=R(C2)>R(C3) and there is a need to select one recipient category, the selection between C1 and C2 can be made, for example, on the basis of demographic or other data related to the recipient or recipients.

It is also possible to select a pricing structure that is used for pricing services or products on the basis of rankings of the recipient categories calculated for a recipient or recipients. For example, a mobile operator that is financed with e.g. commercials related to outdoor activities may use more customer-friendly pricing policy for those subscribers (recipients) whose ranking of a recipient category "interested in outdoor activities" is above a pre-determined limit value than for other subscribers in order to maintain and strengthen customer connections with those subscribers who are good targets for advertising campaigns distributed by the mobile operator. It is also possible to select or tailor an action that will be targeted to one or more recipients on the basis of a ranking assigned to a certain recipient category or rankings assigned to certain recipient categories.

For example, the recipient category may be "Environmental mindset", as exemplified in FIG. 2a. An advertising campaign related to large cars with a high gas consumption is targeted preferably to recipients having the ranking below a first pre-determined limit value, an advertising campaign related to medium cars with a moderate gas consumption is targeted preferably to recipients having the category ranking above the first pre-determined limit value but below a second pre-determined limit value, and an advertising campaign related to small cars with a low gas consumption is targeted preferably to recipients having the category ranking above the second pre-determined limit value. Identification of respondents having category values above the predefined limits can be performed by the network processing component 507.

In a method according to an embodiment of the invention, the rankings of respondents in respect of the various categories are sent to an external device in order to enable the external device to select the one or more recipients to be targets of a pre-determined action as a response to a situation in which the category rankings of the recipient categories fulfill a pre-determined condition.

Figure 7:
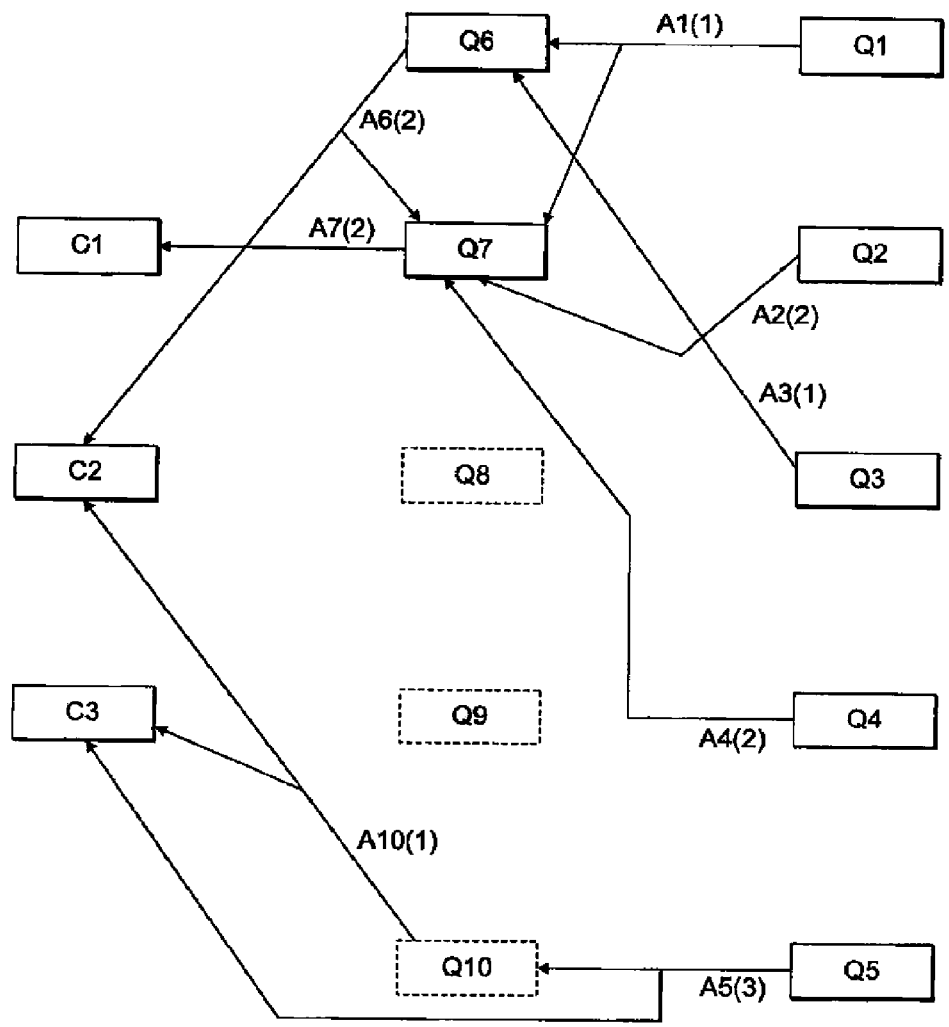
FIG. 7 shows a diagram illustrating exemplifying links that have been set according to a pre-determined rule in a method according to an embodiment of the invention.

As described above, a profiling network N1 is created on the basis of linking information stored in the database 20 (or specified in real-time, as a network is being built). Thus, whilst the database 20 might contain a set of questions relating to a variety of different products, when a profiling network N1 is being generated in relation to a given product type, the linking rules are likely to specify a type of question, namely one suitable to the given product type, so as to generate a network of questions that are relevant to the product in question. FIG. 7 shows a diagram illustrating an alternative set of responses for a profiling network N1 similar to that shown in FIG. 6a. Inspection of FIG. 7 shows that, while present in the database 20, questions Q8 and Q9 have been omitted from the network N1 because these questions are not considered relevant from the viewpoint of the given product; the database may include a rule to this effect in the database 20, which, when processed by the network generating component 501, causes the network N1 to be built without these questions. For example, the product in question may relate to food (and the questions relate to eating habits), whereas the questions Q8 and Q9 may relate to motor oils.

It is also possible that one or more questions are excluded from the network N1 because an advertiser, who has ordered an advertisement campaign in relation to a given product, is not willing to pay for messages containing questions Q8 and Q9 to be sent to recipients. For example, in the situation shown in FIG. 7 the advertiser might have been unwilling to pay for answers given to the questions Q8 and Q9.

For the example shown in FIG. 7, which represents a particular set of responses received (in respect of a profiling network similar to the profiling network N1 of FIG. 6a, but without questions Q8 and Q9), the rankings of the questions can be calculated, for example, as follows:

$R(Q1)=R_0(Q1),$ $R(Q2)=R_0(Q2),$ $R(Q3)=R_0(Q3),$ $R(Q4)=R_0(Q4),$ $R(Q5)=R_0(Q5),$ (3)

$R(Q6)=R_0(Q6)+R(A1(1))/2+R(Q1)+R(A3(1))+R(Q3),$ $R(Q7)=R(Q7)+R(A1(1))/2+R(Q1)+R(A2(2))+R(Q2)+R(A4(2))+R(Q4)+R(Q6)+R(A6(2))/2\ 2,$ and $R(Q10)=R_0(Q10)+R(A5(3))/2+R(Q5).$ The rankings of the recipient categories C1-C2 can be calculated, for example, as follows:

$R(C1)=R_0(C1)+R(A7(2))+R(Q7),$ $R(C2)=R_0(C2)+R(A6(2))/2+R(Q6)+R(A10(1))/2+R(Q10),$ and (4)

$R(C3)=R_0(C3)+R(A10(3))/2+R(Q10)+R(Q5(3))/2+R(Q5).$

By comparing equations (3) and (4) with equations (1) and (2) it can clearly be seen that the category rankings R(C1), R(C2), and R(C3) may have different values when Q8 and Q9 are omitted from the network N1 even if the initial link rankings $R_0(Q1)$–$R_0(Q10)$ were the same in both networks.

As mentioned above, in addition or as an alternative to rankings, links may carry link weightings. When link weighting information is specified, the network processing component 507 is arranged to multiply link rankings and categories rankings with link weighting factors so as to generate category values.

Figure 8:
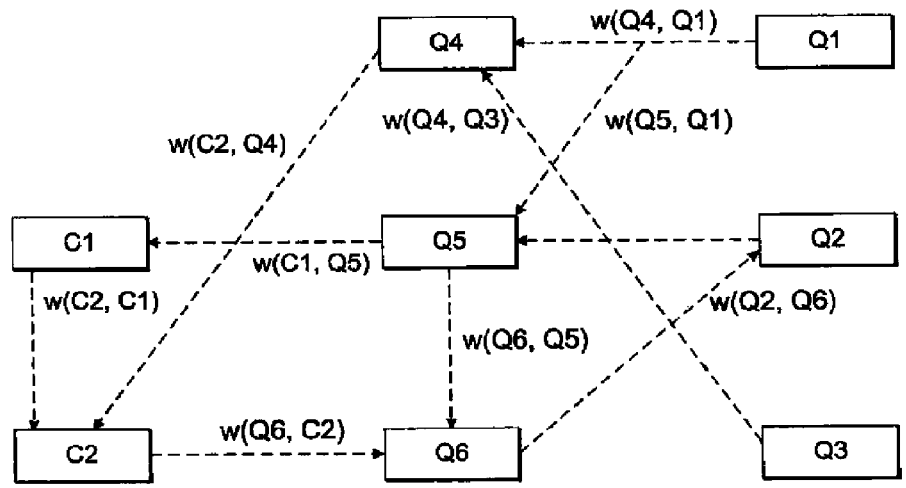
FIG. 8 shows a diagram illustrating exemplifying links that have been set according to a pre-determined rule in a method according to an embodiment of the invention.

FIG. 8 shows a further alternative profiling network N1, comprising six questions, each being linked to other questions and categories according to specified linking rules. As shown in FIG. 8, the ranking of at least one of the questions depends on not only the rankings of those other questions that have a link to that question but also on the rankings of those recipient categories (in this example category C2) that have a link to that question. Correspondingly, the ranking of at least one of the recipient categories depends on not only the link rankings of answers to questions that have a link to that recipient category but also on rankings of those other recipient categories that have a link to that recipient category.

Each link has been associated with a link weight factor, e.g. w(Q4, Q1) that can be used for increasing or decreasing a level of link ranking from a pointing question (or recipient category) to a pointed question (or recipient category). Values of the link weighting factors can be defined, for example, on the basis of demographic data related to the recipients. The equations for the rankings can be formulated, for example, as follows:

$R(Q1)=R_0(Q1),$ $R(Q2)=R_0(Q2)+Q2,Q6)\times R(Q6),$ $R(Q3)=R_0(Q3),$ $R(Q4)=R_0(Q4)+w(Q4,Q1)\times R(Q1)+w(Q4,Q3)\times R(Q3),$ (5)

$R(Q5)=R_0(Q5)+w(Q5,Q1)\times R(Q1)+w(Q5,Q2)\times R(Q2),$ $R(Q6)=R_0(Q6)+w(Q6,Q5)\times R(Q5)+w(Q6,C2)\times R(C2),$ $R(C1)-R_0(C1)+w(C1,Q5)\times R(Q5),$ and $R(C2)=R_0(C2)+w(C2,Q4)\times R(Q4)+w(C2,C1)\times R(C1).$ Equations (5) cannot be solved directly in the same manner as equations (1) and (2), and equations (3) and (4), because the ranking R(Q2) depends on the question ranking R(Q6) that depends on the question ranking R(Q5) that depends in turn on the question ranking R(Q2), i.e. there is at least one closed loop of links. Equations (5) can be presented in the matrix form:

$(I-A)\times R=R_0,$ (6)

where R is a ranking vector [R(Q1), R(Q2), R(Q3), R(Q4), R(Q5), R(Q6), R(C1), R(C2)]$^T$ ($T$=transposition), $R_0$ is a known initial ranking vector [$R_0$(Q1), $R_0$(Q2), $R_0$(Q3), $R_0$(Q4), $R_0$(Q5), $R_0$(Q6), $R_0$(C1), $R_0$(C2)]$^T$, I is a unit matrix, and A is a matrix whose non-zero elements are the link weight factors, e.g. w(C2, C1), presented in equations (5). Equation (6) can be solved with standard methods of the linear algebra, e.g. by forming an inverse matrix $(I-A)^{-1}$ or with an iterative method.

Whilst the link rankings associated with the various answers to the questions are not shown in FIG. 8 and do not appear in equations (5), it will be appreciated that the ranking of any given question Qn will inherit the link ranking information associated with the various questions on the basis of, for example, the relationships expressed in equation (1).

Figure 9:
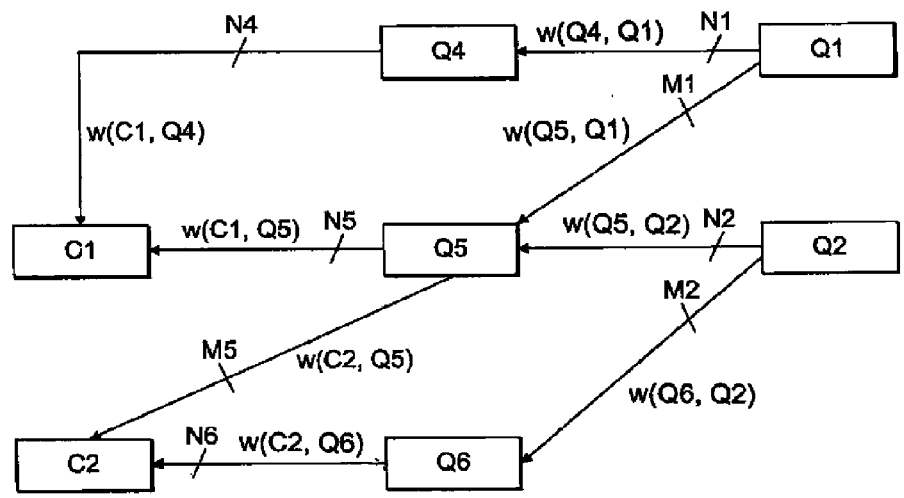
FIG. 9 shows a diagram illustrating exemplifying links that have been set according to one or more pre-determined rules in a method according to an embodiment of the invention.

FIG. 9 shows an example profiling network N1, for which responses have been received in relation to questions Q1, Q2, Q4, Q5, Q6, the links between these questions and categories C1, C2 having been created entirely on the basis of responses received to questions sent by the message processing component 505. More specifically, the message processing component 505 has received N1 messages by way of response A1(1) to question Q1; M1 messages by way of response A1(2) to Q1; N2 messages by way of response A2(1) to question Q2; M2 messages by way of response A2(2) to Q2; N3 messages by way of response A3(1) to question Q3; M3 messages by way of response A3(2) to Q3; N4 messages by way of response A4(1) to question Q4; N5 messages by way of response A5(1) to Q5; N5 messages by way of response A5(2) to Q5; and N6 messages by way of response A6(1) to question Q6.

In this example the link rankings assigned to respective links between questions is calculated by the linking component 503 on the basis of the total number of responses received and numbers of responses matching the various possible answers to a respective question. Thus in the case of answers A1(1) and A1(2) to Q1, the link ranking associated with A1(1) is N1/(N1+M1) and that associated with A1(2) is M1/(N1+M1). FIG. 9 can be interpreted, for example, in such a way that there are N1 parallel links from Q1 to Q4, M1 parallel links from Q1 to Q5, N2 parallel links from Q2 to Q5, etc.

The equations for the question and category rankings can be formulated, for example, as follows:

$R(Q1)=R_0(Q1),$ $R(Q2)=R_0(Q2)$ $R(Q4)=R_0(Q4)+w(Q4,Q1)\times N1/(N1+M1)+R(Q1),$ (7)

$R(Q5)=R_0(Q5)+w(Q5,Q1)\times M1/(N1+M1))+w(Q5,Q2)\times N2/(N2+M2)+R(Q1)+R(Q2),$ $R(Q6)=R_0(Q6)+w(Q6,Q2)\times M2/(N2+M2)+R(Q2),$ $R(C1)-R_0(C1)+w(C1,Q5)\times N5/(N5+M5),+R(Q5),$ and $$R(C2)=R_0(C2)+w(C2,Q5) \times M5/(N5+M5)+w(C2,C6)+R(Q5)+R(Q6).$$

Any given link weight factor, e.g. w(Q4, Q1), shown in FIG. 9 can be set, for example, on the basis of demographic data related to the recipients and/or a ratio between a number of recipients who have answered a certain question and a total number of recipients to whom this question has been delivered. For example, in a case in which the question Q1 has been delivered to NQ1 recipients the link weight factors w(Q4,Q1) and w(Q5,Q1) can be set as w(Q4,Q1)=(Q5,Q1)=(N1+M1)/NQ1 because Q1 has been answered by N1+M1 recipients. This exemplifying way of setting the link weight factors corresponds to providing FIG. 9 with a "sink" that does not have any links to questions and to recipient categories, and a link pointing from a question to the "sink" is set each time when a recipient does not answer a question, i.e. a link from a question to the "sink" corresponds with the "no answer"—case.

The link rankings that can be calculated from equations (7) can be interpreted to represent average link rankings for all those recipients that have answered the questions Q1, Q2, Q4, Q5, and Q6.

Additional Details and Modifications

Whilst in the above embodiments the content items are shown as messages with content that can be paraphrased as questions, it is to be appreciated that the content items could comprise data having links (URL) to web sites and the like, and for which, clicking on a given URL has the effect of navigating the recipient to the web site. The web site can have rules associated therewith, which determine a response based on the user action. There might be several possible responses, each associated with a particular URL, which are stored in the database 22 and processed in the manner described above. Further, each of the content items, in this case URLs to web sites, can be linked to other URLs to form the profiling network N1 in any of the manners described above.

As described above, the profiling system S2 comprises a set of computer software components, and these can be e.g. created in accordance with a procedural programming language or an object oriented programming language.

The components so created can be stored in a computer readable medium and/or distributed over a network by means of conventional transport techniques. The computer readable medium can be e.g. a CD-ROM (Compact Disc Read Only Memory) or a RAM-device (Random Access Memory).

While there have been shown and described and pointed out fundamental novel features of the invention as applied to embodiments thereof, it will be understood that various omissions and substitutions and changes in the form and details of the processes and devices described may be made by those skilled in the art without departing from the inventive idea defined in the independent claims. For example, it is expressly intended that all combinations of those process steps or device elements which perform substantially the same function in substantially the same way to achieve the same results are within the scope of the invention. Moreover, it should be recognized that process steps and device elements shown and/or described in connection with any disclosed form or embodiment of the invention may be incorporated in any other disclosed or described or suggested form or embodiment as a general matter of design choice. The specific examples provided in the description given above should not be construed as limiting. Therefore, the invention is not limited merely to the embodiments described above, many variants being possible without departing from the inventive idea defined in the independent claims.

What is claimed is:

1. A database comprising a memory and a storage system arranged to hold a plurality of sets of records, a first set of records corresponding to content items for deliver to potential respondents, and a second set of records corresponding to potential responses to the content items from actual respondents, wherein the database comprises an interface for use in specifying:
    a first set of links between individual content items of the first set and responses of the second set, each said content item being capable of having a link to more than one different response of the second set and the database being operable to further store first link data indicative of a plurality of different links between a given individual content item and a corresponding plurality of responses of the second set; and
    a second set of links between individual content items of the first set, each said content item being capable of having a link to one or more other content item, the database being operable to further store second link data indicative of a plurality of different links between the one content item and a corresponding plurality of said other content items.

2. The database of claim 1, wherein the interface is further operable for use in specifying a third set of links between at least some said individual content items of the first set and characteristics of a respondent.

3. The database of claim 1, wherein the database is operable to store said first link data specifying a direction of linking between said given individual content item and said plurality of responses of the second set.

4. The database of claim 1, wherein the database is operable to store said second link data specifying a direction of linking between said one content item and said plurality of other content items.

5. The database of claim 2, wherein the database is operable to store said third link data specifying a direction of linking between linked content items and said categories.

6. The database of claim 1, wherein the interface is further operable to receive data indicative of values associated with said first set of links, said second set of links and said third set of links and the database is arranged to store said value data in association with the corresponding set of links.

* * * * *